US008483865B2

(12) United States Patent
Iwashita et al.

(10) Patent No.: US 8,483,865 B2
(45) Date of Patent: Jul. 9, 2013

(54) NUMERICAL CONTROLLER WITH TOOL TRAJECTORY DISPLAY FUNCTION

(75) Inventors: Yasusuke Iwashita, Minamitsuru-gun (JP); Tadashi Okita, Minamitsuru-gun (JP); Junichi Tezuka, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 254 days.

(21) Appl. No.: 13/020,165

(22) Filed: Feb. 3, 2011

(65) Prior Publication Data

US 2011/0202167 A1 Aug. 18, 2011

(30) Foreign Application Priority Data

Feb. 18, 2010 (JP) ................................. 2010-033298

(51) Int. Cl.
*G06F 19/00* (2011.01)
(52) U.S. Cl.
USPC ......................................... 700/184; 700/187
(58) Field of Classification Search
USPC .................................................. 700/184, 187
See application file for complete search history.

(56) References Cited

U.S. PATENT DOCUMENTS

| 4,572,998 | A | * | 2/1986 | Nozawa et al. ................ 318/572 |
| 4,659,265 | A | * | 4/1987 | Kishi et al. ...................... 409/84 |
| 5,282,144 | A | | 1/1994 | Kawamura et al. |
| 6,775,586 | B2 | * | 8/2004 | Shibata et al. ................ 700/189 |
| 8,190,287 | B2 | * | 5/2012 | Iwashita et al. ............... 700/182 |

FOREIGN PATENT DOCUMENTS

| DE | 691 21 518 T2 | 1/1997 |
| JP | 63-113 608 A | 5/1988 |
| JP | 63-257003 | 10/1988 |
| JP | 08-206 940 A | 8/1996 |
| JP | 9-69003 | 3/1997 |
| JP | 9-244721 A | 9/1997 |

OTHER PUBLICATIONS

Luo Fuyuan, "Exploitation and Study of Open Architecture Three-Axes CNC System Based on Windows," China Master's Theses Full-Text Database, Engineering Science and Technology 1, No. 2 (Dec. 15, 2002), Chapter 3 section 2, Chapter 7 section 3 and Figs. 3-3, 8-2.

Zhang Chengxin, "Exploitation and Study of Open Architecture Three-Axes CNC System Based on Windows," China Master's Theses Full-Text Database, Engineering Science and Technology 1, No. 9 (Sep. 15, 2006), Section 2.2, section 5.3 and Fig. 5.16 and Fig. 5.17.

* cited by examiner

*Primary Examiner* — Ryan Jarrett
(74) *Attorney, Agent, or Firm* — Drinker Biddle & Reath LLP

(57) ABSTRACT

Coordinate values of a tool center point is calculated by obtaining coordinate values at each time of respective drive axes driven by a numerical controller. A tool radius compensation vector connecting the calculated tool center point at each time and an actual machining point is obtained. Then, coordinate values of the actual machining point are calculated based on the calculated coordinate values of the tool center point and the obtained tool radius compensation vector, and the trajectory of the actual machining point is displayed on a display.

1 Claim, 6 Drawing Sheets

NUMERICAL CONTROLLER WITH TOOL TRAJECTORY DISPLAY FUNCTION

RELATED APPLICATION DATA

This application claims priority under 35 U.S.C. §119 and/or §365 to Japanese Application No. 2010-033298 filed Feb. 18, 2010, the entire contents of which are incorporated herein by reference.

BACKGROUND OF THE INVENTION

1. Field of the Invention

The present invention relates to a numerical controller having a tool trajectory display function.

2. Description of the Related Art

Coordinate values of the tool center point are calculated from coordinate values of respective axes, and based on the calculated coordinated values, a shape of a machined surface is determined. Japanese Patent Application Laid-Open No. 9-69003 discloses a method for calculating a compensation vector for avoiding interference due to tool radius compensation. Further, Japanese Patent Application Laid-Open No. 63-257003 discloses a technique relating to calculating a tool radius compensation vector.

In a five-axis machining tool, it is possible to calculate coordinate values of a tool center point based on coordinate values of the respective axes, and to calculate a tool trajectory from the obtained coordinate values of the tool center point. However, due to the effect of the tool radius in actual machining, the shape of a trajectory of a tool center point 220 of a tool 22 such as a ball-end mill and that of a trajectory of an actual machining point do not match with each other, and the shape of the trajectory of the tool center point 220 and the shape of a machined surface of a workpiece do not always match with each other, as shown in FIG. 6.

In machining using a numerical controller, compensation is generally made considering the effect of the tool radius, and a trajectory that is more closer to the shape of a machined surface can be calculated by obtaining a tool radius compensation vector simultaneously with coordinate values of respective axes.

In actual machining, the shape of a trajectory of a tool center point and the shape of a machined surface do not match with each other due to the effect of the tool radius. While the trajectory of a tool center point can be calculated from coordinate values of the respective axes, it is disadvantageously difficult to calculate the shape of a machined surface.

SUMMARY OF THE INVENTION

Therefore, in view of the above-described disadvantage of the related art, it is an object of the present invention to provide a numerical controller having a function of displaying a trajectory of an actual machining point by using a tool radius compensation vector controlled by the numerical controller.

To achieve the object, a numerical controller according to the present invention has a tool trajectory display function for displaying a tool trajectory of a machine tool that controls position and orientation of a tool and a workpiece using a plurality of drive axes and performs machining. The numerical controller comprises: an instructing unit that outputs a positional instruction to each of the drive axes; a drive axis controlling unit that controls a movement of a drive axis according to the positional instruction output from the instructing unit; a coordinate value obtaining unit that obtains coordinate values of the respective axes at each time; a tool center point coordinate value obtaining unit that calculates coordinate values of a tool center point from the coordinate values of the respective axes obtained by the coordinate value obtaining unit; a tool radius compensation vector obtaining unit that obtains a tool radius compensation vector connecting the tool center point and an actual machining point at each time; an actual machining point calculating unit that calculates coordinate values of the actual machining point based on the coordinate values of the tool center point calculated by the tool center point coordinate value calculating unit and the tool radius compensation vector obtained by the tool radius compensation vector obtaining unit; and an actual machining point display unit that displays a trajectory of the actual machining point calculated by the actual machining point calculating unit.

According to the above-described configuration, the present invention can provide a numerical controller having a function of displaying a trajectory of an actual machining point by using a tool radius compensation vector controlled by the numerical controller.

DETAILED DESCRIPTION OF THE PREFERRED EMBODIMENTS

Figure 1:
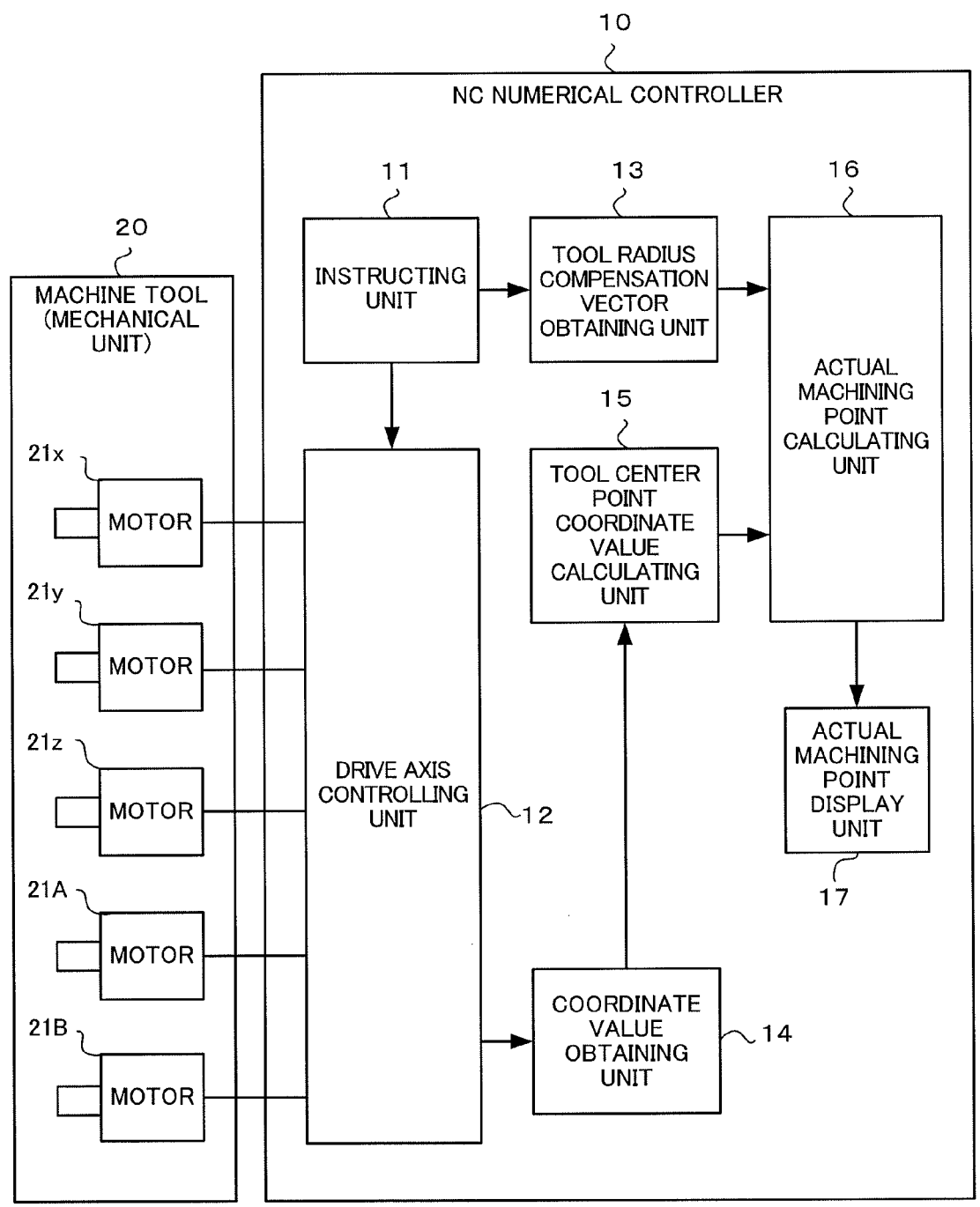
FIG. 1 is a functional block diagram for explaining an embodiment of a numerical controller according to the present invention.

FIG. 1 is a functional block diagram for explaining an embodiment of a numerical controller according to the present invention.

A numerical controller 10 controls a machine tool 20 according to a machining program (not shown) to machine a workpiece (not shown in FIG. 1). An instructing unit 11 reads the machining program and analyzes a block described in the read machining program to generate a movement instruction, and sends the generated movement instruction to a drive axis controlling unit 12. When a tool radius compensation instruction is described in the machining program, the instructing unit 11 calculates a tool radius compensation vector. Then, the instructing unit 11 sends to the drive axis controlling unit 12 a movement instruction in which an amount of the tool radius compensation vector has been compensated.

The drive axis controlling unit 12 moves a tool of the machine tool along a machining path specified by the machining program based on the movement instruction sent from the instructing unit 11 and position feedback information (not shown) from motors 21x, 21y, 21z, 21A and 21B of the respective axes (five axes X, Y, Z, A and B of the machine tool) included in a mechanical unit of the machine tool 20. A tool radius compensation vector obtaining unit 13 obtains the tool radius compensation vector data calculated in the instructing unit 11 and sends the obtained tool radius compensation vector data to an actual machining point calculating unit 16.

As described above, the drive axis controlling unit 12 calculates current positions of the respective axes based on the movement instruction and the position feedback information (not shown) from the motors 21$x$, 21$y$, 21$z$, 21A and 21B of the respective axes, and stores the obtained current positions in a current position register (not shown).

A coordinate value obtaining unit 14 obtains the current position data of the respective axes stored in the current position register of the drive axis controlling unit 12, and sends the obtained current position data of the respective axes to a tool center point coordinate value calculating unit 15. The tool center point coordinate value calculating unit 15 calculates coordinate values of the tool center point based on the current position data of the respective axes sent from the coordinate value obtaining unit 14, and sends the calculated coordinate value data of the tool center point to the actual machining point calculating unit 16.

The actual machining point calculating unit 16 calculates position data of an actual machining point, at which the workpiece is actually machined by a tool 22 (see FIGS. 2 and 3) mounted on the machine tool 20, based on the tool radius compensation vector data sent from the tool radius compensation vector obtaining unit 13 and the tool center point coordinate value data sent from the tool center point coordinate value calculating unit 15, and sends the obtained actual machining point data to an actual machining point display unit 17. The actual machining point display unit 17 displays a trajectory of the actual machining point based on the actual machining point data on a display such as a liquid crystal display included in the actual machining point display unit 17.

Figure 2:
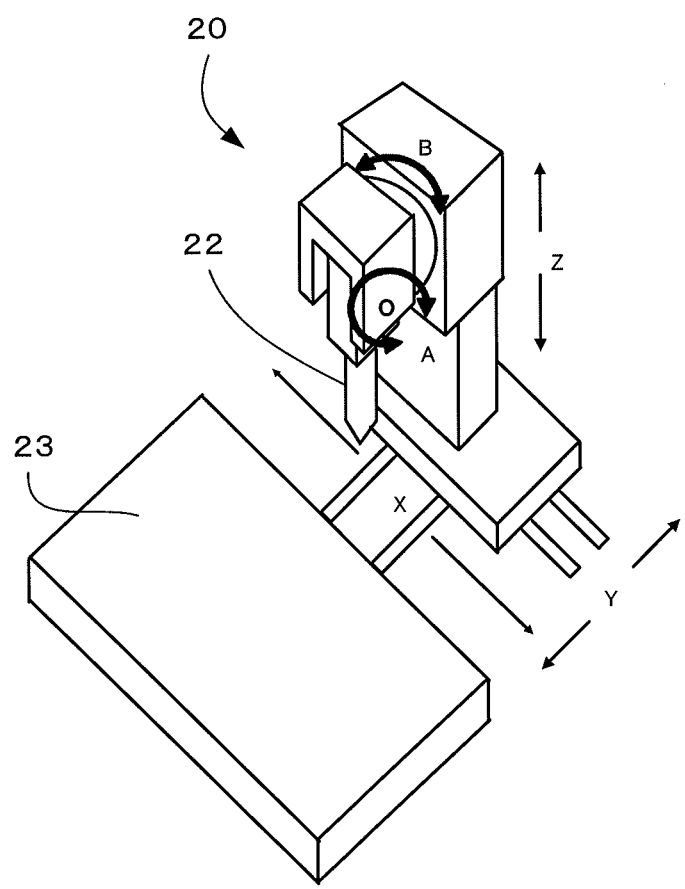
FIG. 2 is an outline perspective view of a tool head rotary type five-axis machining tool as an example of a machine tool controlled by the numerical controller of FIG. 1.

Next, the calculation of the tool center point coordinate will be described with reference to FIG. 2. FIG. 2 is an outline perspective view of an example of a tool head rotary type five-axis machining tool.

The five-axis machining tool of FIG. 2 has X-, Y- and Z-axes, which are linear axes, and A- and B-axes, which are rotary axes. The coordinates of the five axes at time t are represented by x(t), y(t), z(t), a(t) and b(t), respectively. A workpiece to be machined by the tool 22 is placed on a table 23. The center point 220 (see FIG. 3) of the tool 22 moves relatively to the workpiece 24 (see FIG. 3) placed on the table 23 by driving the X-, Y-, and Z-axes, which are linear axes, and the A- and B-axes, which are rotary axes.

When an intersection of rotation center axes of two rotary axes (A- and B-axes) of a five-axis machining tool having a tool head rotary type machine structure is M (see FIG. 3), the coordinate of the point M can be expressed by (x(t), y(t), z(t)) in a coordinate system considered to be fixed to the workpiece 24 and having an appropriate point of origin. Further, when the length from the point M to the tool center point 220 is L and a position at which the tool 22 is oriented straight downward is a reference position (point of origin) of the A-axis and the B-axis, the coordinate value (PosX(t), PosY(t), PosZ(t)) of the tool center point 220 can be obtained by the following equations.

$$PosX = x(t) + L \times \cos(a(t)) \times \sin(b(t))$$

$$PosY = y(t) + L \times \sin(a(t))$$

$$PosZ = z(t) - L \times \cos(a(t)) \times \cos(b(t))$$

Figure 3:
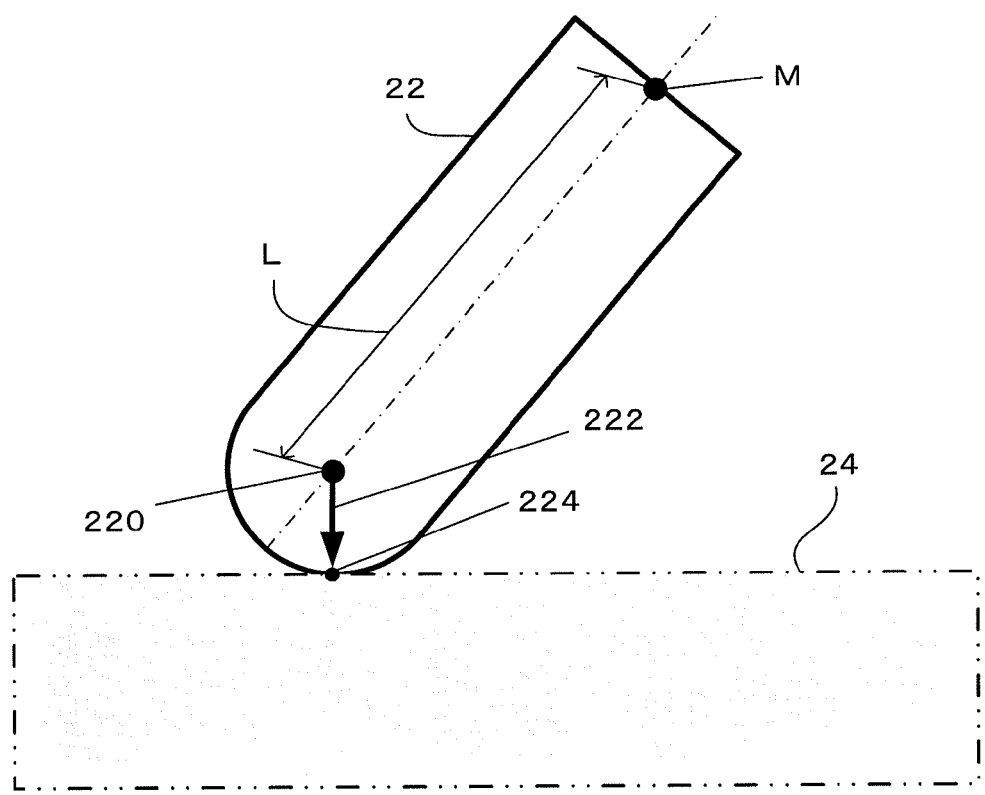
FIG. 3 is a diagram explaining a tool radius compensation vector where a tool of the five-axis machining tool of FIG. 2 is a ball-end mill.

Next, the tool radius compensation vector will be described with reference to FIG. 3. FIG. 3 shows an example where the tool 22 of the five-axis machining tool of FIG. 2 is a ball-end mill.

The positional relation between the tool 22 and a cutting surface of the workpiece 24 is defined, as shown in FIG. 3, such that the tool center point 220 and an actual machining point 224 of the cutting point is separated by the tool radius and a vector connecting the two points 220 and 224 is the tool radius compensation vector 222.

The tool radius compensation vector 222 is generally a vector in the normal direction of the cutting surface and, when machining is performed according to a machining program, the tool radius compensation vector 222 is calculated considering the tool radius of the tool 22 in calculating positional instructions of the respective axes so as to obtain a cutting point according to the machining program. Since the method for calculating a tool radius compensation vector is a conventionally known technique as described, for example, in the above-mentioned Japanese Patent Application Laid-Open No. 63-257003, detailed description thereof is not provided herein.

Figure 4:
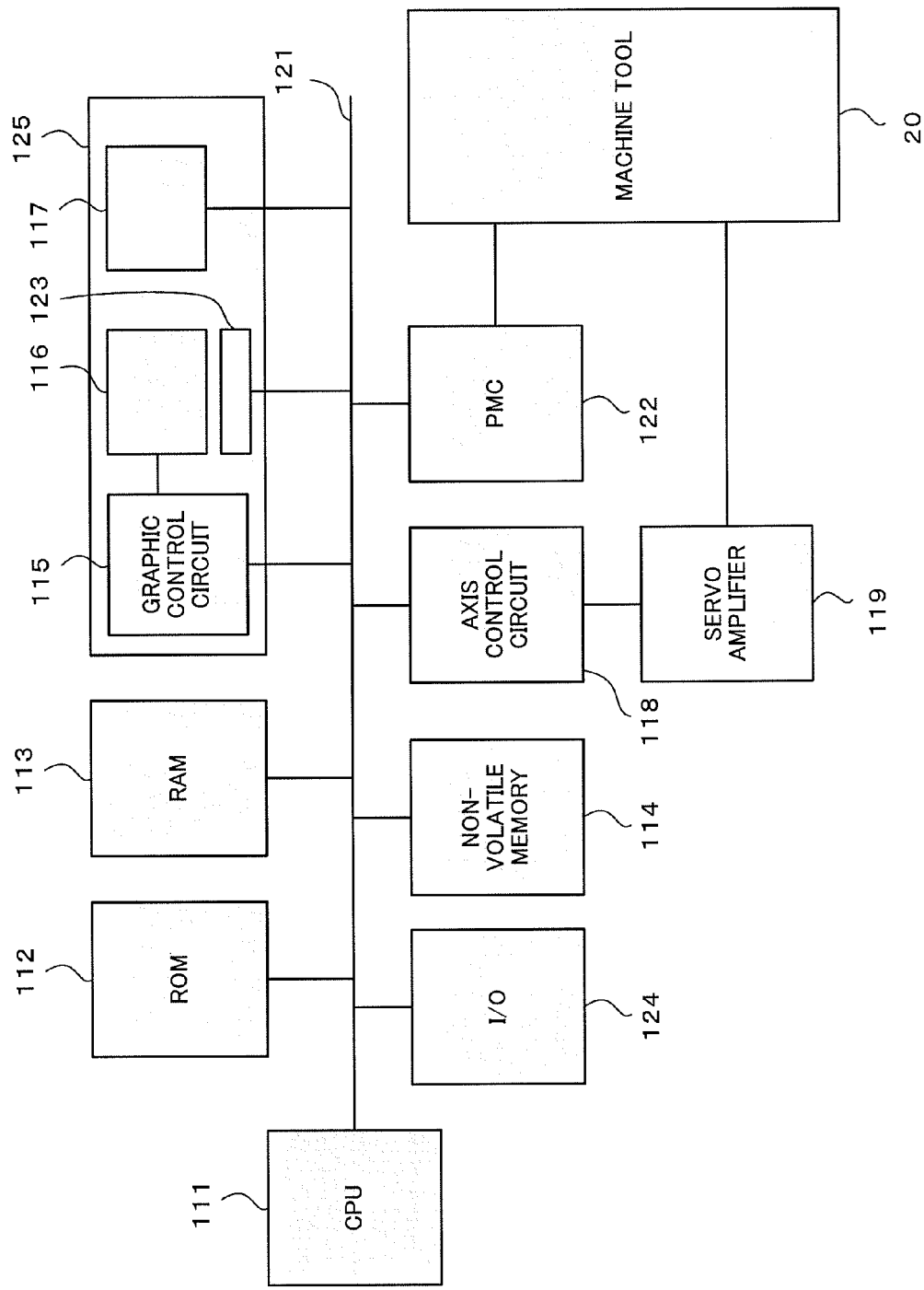
FIG. 4 is a schematic diagram for explaining an embodiment of a numerical controller having a tool trajectory display function according to the present invention.

FIG. 4 is a schematic diagram for explaining an embodiment of a numerical controller having a tool trajectory display function according to the present invention.

A CPU 111, which is a processor, controls the entire numerical controller 10 according to a system program stored in a ROM 112. A RAM 113 has various data and input/output signals stored therein. Various data stored in a non-volatile memory 114 remains stored in the memory 114 even after power is turned off.

A graphic control circuit 115 converts a digital signal to a signal for display and provides the converted signal to the display 116. A keyboard 117 is means for inputting various data for setting having numeric keys, character keys and the like. An axis control circuit 118 receives movement instructions for the respective axes from the CPU 111 and outputs the movement instructions to servo amplifiers 119 of the corresponding axes, respectively. The servo amplifiers 119 in receipt of the movement instructions drive the corresponding servomotors (not shown) included in the machine tool 20. These components are connected to one another through a bus 121.

A programmable machine controller (PMC) 122 receives a T function signal (tool selecting instruction) and the like via the bus 121 during execution of the machining program. Then, the PMC 122 processes the received signal according to a sequence program and outputs as an operation instruction to control the machine tool 20. Further, the PMC 122 receives a state signal from the machine tool 20 and transfers a necessary input signal to the CPU 111.

In addition, a software key 123 whose function changes according to the system program or the like and an interface 124 for transmitting NC data to an external device such as a storage device are connected to the bus 121. The software key 123 is arranged on a display/manual data input (MDI) panel 125 together with the display 116 and the keyboard 117. The display 116 corresponds to the actual machining point display unit 17 described with reference to FIG. 1 and displays a trajectory of an actual machining point by using the tool radius compensation vector controlled by the numerical controller.

Figure 5:
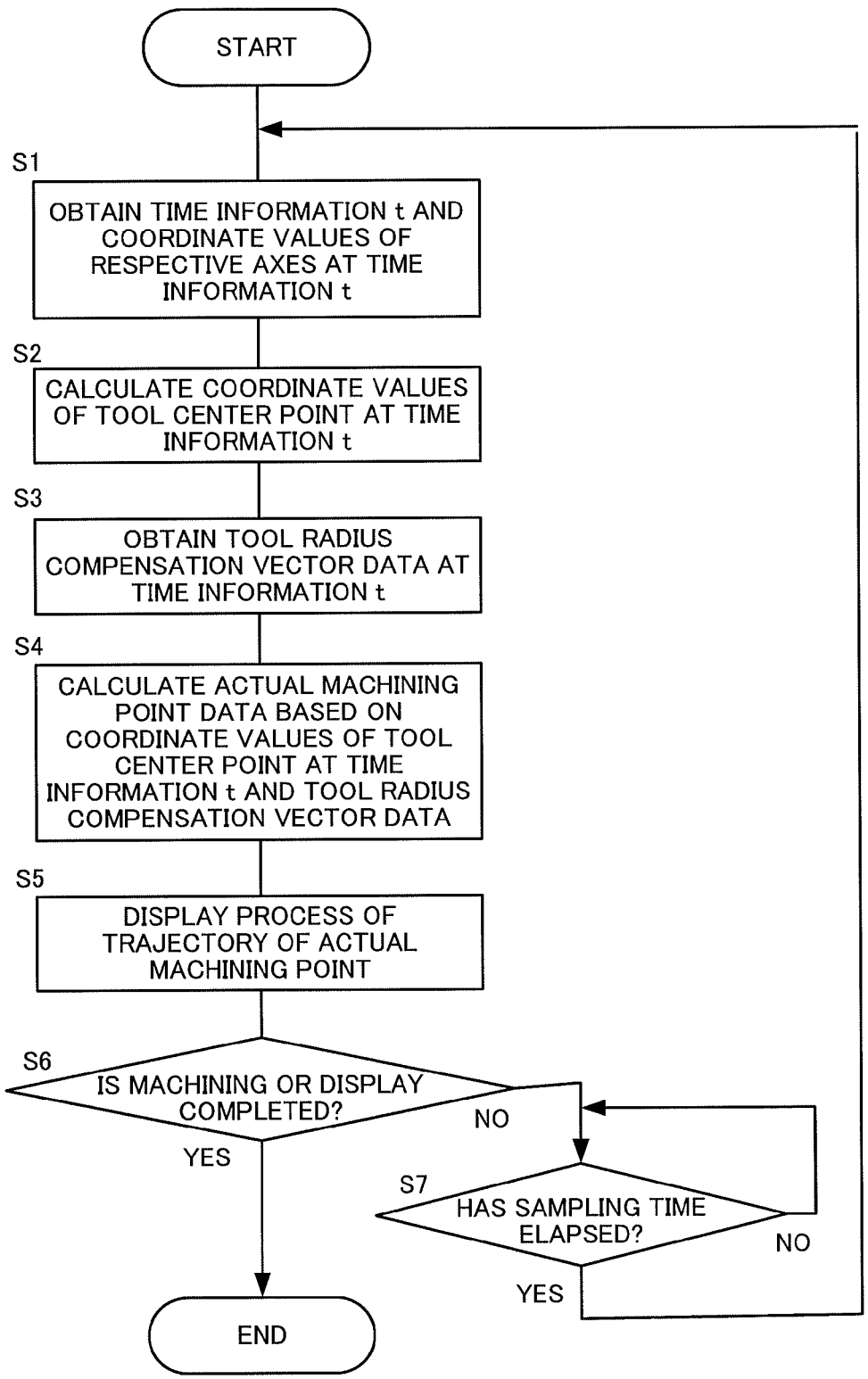
FIG. 5 is a flowchart showing an algorithm of a display process performed by the numerical controller of FIG. 4.
Figure 6:
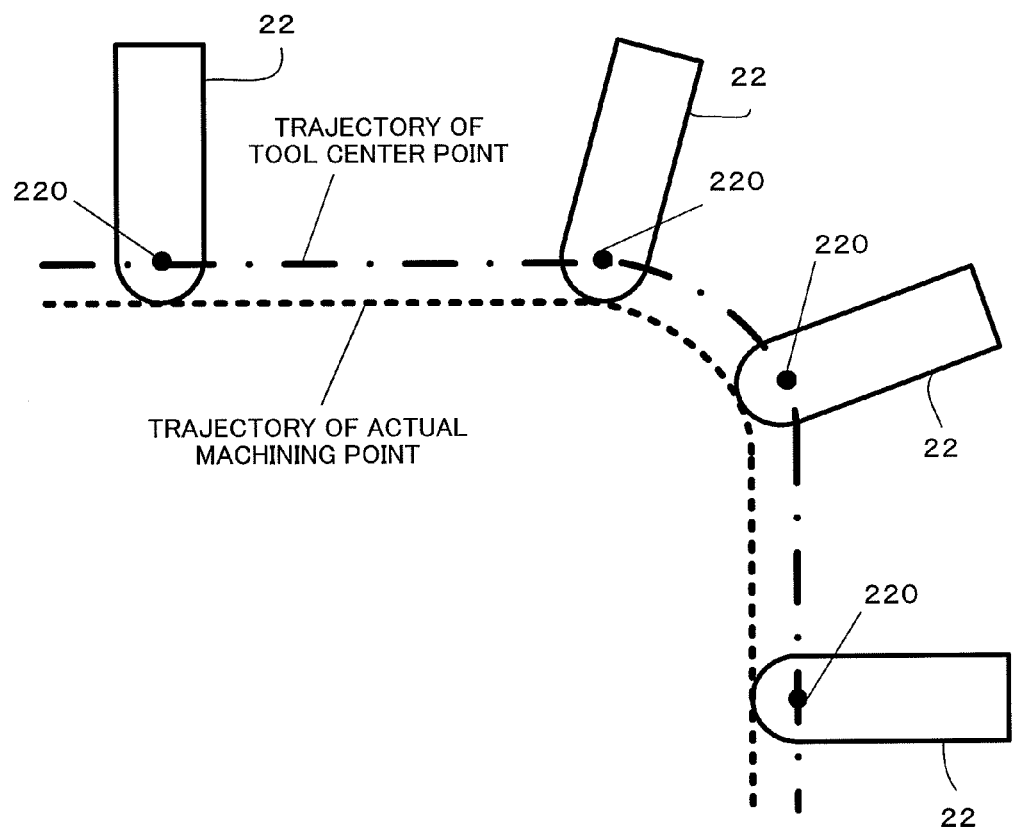
FIG. 6 is a diagram for explaining a trajectory of a tool center point and a trajectory of an actual machining point.

FIG. 5 is a flowchart showing an algorithm executing a display process according to the present invention, which is performed by the numerical controller 10 shown in FIG. 4. The process will be described for respective steps as follows.

[Step S1] Time information t and coordinate values of the respective axes at the time information t are obtained.
[Step S2] Coordinate values of the tool center point at the time information t are calculated.
[Step S3] The tool radius compensation vector data at the time information t is obtained.
[Step S4] The actual machining point data is calculated based on the coordinate value data of the tool center point at the time information t and the tool radius compensation vector data.
[Step S5] A trajectory of the actual machining point is displayed.
[Step S6] It is determined whether machining or display is completed, and the display process is terminated when determined that machining or display is completed, whereas the process proceeds to step S7 when determined that machining or display is not completed yet.
[Step S7] The process goes back to step S1 after a sampling time for obtaining trajectory data of the actual machining point elapses and the display process is continued.

The invention claimed is:

1. A numerical controller having a tool trajectory display function for displaying a tool trajectory of a machine tool that controls position and orientation of a tool and a workpiece using a plurality of drive axes according to a machining program including a tool radius compensation instruction and performs machining of the workpiece, the numerical controller comprising:
  an instructing unit that outputs a positional instruction to each of the drive axes;
  a drive axis controlling unit that controls a movement of a drive axis according to the positional instruction output from the instructing unit;
  a coordinate value obtaining unit that obtains coordinate values of the respective axes;
  a tool center point coordinate value obtaining unit that calculates coordinate values of a tool center point from the coordinate values of the respective axes obtained by the coordinate value obtaining unit;
  a tool radius compensation vector obtaining unit that obtains a tool radius compensation vector connecting the tool center point and an actual machining point;
  an actual machining point calculating unit that calculates coordinate values of the actual machining point based on the coordinate values of the tool center point calculated by the tool center point coordinate value calculating unit and the tool radius compensation vector obtained by the tool radius compensation vector obtaining unit; and
  an actual machining point display unit that displays a trajectory of the actual machining point calculated by the actual machining point calculating unit.

* * * * *